United States Patent
Boldia

(10) Patent No.: US 6,672,559 B1
(45) Date of Patent: Jan. 6, 2004

(54) FISHING POLE HOLDER

(76) Inventor: Joseph Boldia, 3510 Veronica Dr., Sterling Heights, MI (US) 48310

( * ) Notice: Subject to any disclaimer, the term of this patent is extended or adjusted under 35 U.S.C. 154(b) by 0 days.

(21) Appl. No.: 10/212,569

(22) Filed: Aug. 2, 2002

(51) Int. Cl.[7] .................. A01K 97/10; A45B 25/28; A47G 25/12; A47G 33/12
(52) U.S. Cl. .................. 248/538; 248/534; 248/540
(58) Field of Search .................. 248/538, 534, 248/540; 224/922, 401, 488, 489; 43/21.2; 211/70.8

(56) References Cited

U.S. PATENT DOCUMENTS

| | | | | | |
|---|---|---|---|---|---|
| 1,091,491 A | * | 3/1914 | Ebur | .................. | 248/515 |
| 1,876,478 A | * | 12/1932 | Van Duzer | .................. | 248/210 |
| 2,540,584 A | * | 2/1951 | Jaycox | .................. | 248/42 |
| 2,564,625 A | * | 8/1951 | Jackson et al. | .................. | 43/21.2 |
| 2,985,414 A | * | 5/1961 | Ince | .................. | 248/515 |
| 3,385,544 A | * | 5/1968 | Barnett | .................. | 248/39 |
| 3,484,066 A | * | 12/1969 | Aunspaugh | .................. | 248/41 |
| 4,227,671 A | * | 10/1980 | Bourassa et al. | .................. | 248/480 |
| 4,231,501 A | * | 11/1980 | Goode | .................. | 224/546 |
| 4,455,006 A | * | 6/1984 | Aaserude | .................. | 248/205.6 |
| 4,528,768 A | * | 7/1985 | Anderson | .................. | 43/21.2 |
| 5,052,581 A | * | 10/1991 | Christ et al. | .................. | 220/570 |
| 5,163,652 A | * | 11/1992 | King | .................. | 248/538 |
| 5,247,759 A | * | 9/1993 | Noriega | .................. | 43/21.2 |
| 5,561,937 A | * | 10/1996 | Johnson | .................. | 43/21.2 |
| 5,975,479 A | * | 11/1999 | Suter | .................. | 248/534 |
| 6,003,746 A | * | 12/1999 | Richardson | .................. | 224/200 |
| 6,089,524 A | * | 7/2000 | Lai | .................. | 248/535 |

* cited by examiner

Primary Examiner—Leslie A. Braun
Assistant Examiner—Amy J. Sterling

(57) ABSTRACT

The rail mounted fishing pole holder is a specially designed device uniquely tailored to provide optimal support and convenience while using the inherent design of railing on most watercraft. A specially engineered mount is shaped to attach to an upper and a lower railing while also supporting a holder in an appropriately slanted position. Design specific clamps are structured to be adjustably affixed to said mount and enclose said railings. A cylindrical housing is incorporated with this demountable design to provide ease of use and economy of production.

20 Claims, 3 Drawing Sheets

FISHING POLE HOLDER

BACKGROUND OF THE INVENTION

1. Field of the Invention

The present invention relates to a device designed to retain a fishing pole in an upright position proximate to the railing of a watercraft.

2. Description of the Prior Art

Fishing is one of the most popular activities in the United States. Typically fisherman use a pole to cast a line into the water where bait attached to the line lures fish. The bait is attached to a hook that will grip a fish when they attempt to bite the bait. The fisherman then uses a reel attached to the pole to pull back said line and said fish attached thereto. Frequently fishermen spend several hours during this activity. There are times when the user needs to release the pole to use their hands in other tasks or simply to rest them. There are several reasons why a holder for the fishing pole would be extremely convenient in this instance. Firstly, the line on fishing poles can become easily entangled when a pole is set down on the ground. The hook attached to the line is sharp and can cause injury. Having a holder mounted out of the way and upright would prevent either of these difficulties. A holder of this type should be easily mounted and retrieved. Secondly fishermen often like to leave their line in the water for long period of times to attract fish to the bait. A holder should be mountable so that the user can mount the pole in the holder and the pole will be held in a position where the line can remain cast into the water.

Many of the inventions that exist in the prior art incorporate permanent mounting mechanisms. This is defective since the device would be limited to use at one location rather then any point on the boat or on multiple boats. None of the inventions in the prior art that comprise a removable mounting mechanism are designed to accommodate a watercraft railing. Many watercrafts comprise a two rail railing design that extends around the perimeter. A convenient device would be specifically designed to mount onto this railing and hold a fishing pole in a position in which it can maintain a cast.

U.S. Pat. No. 3,870,259 to Lester A. Reynolds discloses a fishing rod holder that comprises a permanently mounted bracket. A holder is attached to a cleat that slides into the bracket. The bracket and cleat design of this invention would not have the convenient remountable design of the present invention. In addition the bracket is mounted using a plurality of bolts passing into a fixture on a boat. This can be problematic with many modem railings since they often are made of metal.

U.S. Pat. No. 5,014,458 to Larry C. Wagner is an alternate design for a fishing pole holder that also uses a permanently attached mechanism. In this invention a base that comprises a bracket similar to the Reynolds '259 patent is permanently attached to a fixture on a boat. The abovementioned deficiencies of a permanent mechanism apply here. In addition the holder design of the Wagner '458 design departs greatly from the present invention. No base exists in the Wagner '458 design. In addition the Wagner '458 design requires several parts that would be more expensive to produce and would be susceptible to wear and tear causing the holder to malfunction over time.

U.S. Pat. No. 6,213,441 to Baynard et al. comprises a mounting mechanism that is permanently screwed into a fixture on a boat. The holder is then attached to said mounting mechanism by a threaded bolt design. The abovementioned deficiencies of a permanent mechanism apply here. The holder illustrated here departs greatly from the present invention. No base exists in the Baynard '441 design. In addition the Baynard '441 design holds the rod in a less desirable horizontal position.

U.S. Pat. No. 5,975,479 to Bo Suter and U.S. Pat. No. 3,992,798 to Anthony S. Schmitt U.S. Pat. No. 3,992,798 are the only prior art inventions that disclose a nonpermanent mounting mechanism. The designs of these mechanisms comprise a c-clamp design that provides a base upon which is mounted a fishing pole holder. This design is not as uniquely suited to railings as the present invention. It does not offer the level of support of the present invention because it is limited to a single mounting point. The holders illustrated here depart greatly from the present invention. No base exists in the Suter '479 and Schmitt '798 designs. In addition both designs require several parts that would be more expensive to produce and would be susceptible to wear and tear.

U.S. Pat. No. Des. 303,003 to Napoleon Combs is a design for a fishing rod holder that also uses a permanently attached mounting mechanism. The abovementioned deficiencies of a permanent mechanism apply here. In addition the holder in the Combs '003 design is supported at a single point on its base. This design will not provide the level of support that exists in the present invention.

Therefore a need exists for a novel and enhanced method for mounting a fishing rod so that it will sit securely and be easy to be removed. This need includes adaptability to railings of many boats and an adequate level of support. In this respect, the rail mounted fishing pole holder according to the present invention substantially departs from the conventional concepts and designs of the prior art, and in doing so provides an apparatus primarily developed for the purpose of mounting fishing rods to the rails of watercraft.

SUMMARY OF THE INVENTION

In view of the foregoing disadvantages inherent in the known types of mounting devices for fishing poles now present in the prior art, the present invention provides an improved combination of security and utility, and overcomes the abovementioned disadvantages and drawbacks of the prior art. As such, the general purpose of the present invention, which will be described subsequently in greater detail, is to provide a new and improved rail mounted fishing pole holder which has all of the advantages of the prior art mentioned heretofore and many novel features that result in a rail mounted fishing pole holder which is not anticipated, rendered obvious, suggested, or even implied by the prior art, either alone or in combination thereof.

In furtherance of this objective, the rail mounted fishing pole holder comprises a seven-shaped holder mount that comprises an upper arm and a bottom arm. The ends of said arms are separated by a distance equal to the standard distance between rails on watercraft. Attached to said ends of said arms are brackets.

There has been outlined, rather broadly, the more important features of the invention in order that the detailed description thereof that follows may be better understood and in order that the present contribution to the art may be better appreciated.

The present invention may in addition comprise a fishing pole holder that is attached to said lower arm. Said holder compromises a drum with a base and an opening surrounded by a rim.

An additional aspect of the rail mounted fishing pole holder is that said holder is attached to said mount by a plurality of threaded bolts passing through a plurality of holes in said lower arm and a plurality of threaded holes in the side of said holder.

In order to optimize the design of the present invention for use with railing on watercraft the present invention incorporates a lower bracket shaped to grasp a lower railing and hold said lower arm at an angle passing upwards to hold a fishing pole at an angular position. In addition an upper bracket is also incorporated that is shaped to grasp an upper rail and hold said upper arm in a position perpendicular to said upper rail.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rail mounted fishing pole holder that has all of the advantages of the prior art and none of the disadvantages.

It is another object of the present invention to provide a new and improved rail mounted fishing pole holder that may be easily and efficiently manufactured and marketed.

An even further object of the present invention is to provide a new and improved rail mounted fishing pole holder that has a low cost of manufacture with regard to both materials and labor, and which accordingly is then susceptible of low prices of sale to the consuming public, thereby making such improved rail mounted fishing pole holder economically available to the buying public.

Still another object of the present invention is to provide a new rail mounted fishing pole holder that provides in the apparatuses and methods of the prior art some of the advantages thereof, while simultaneously overcoming some of the disadvantages normally associated therewith.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
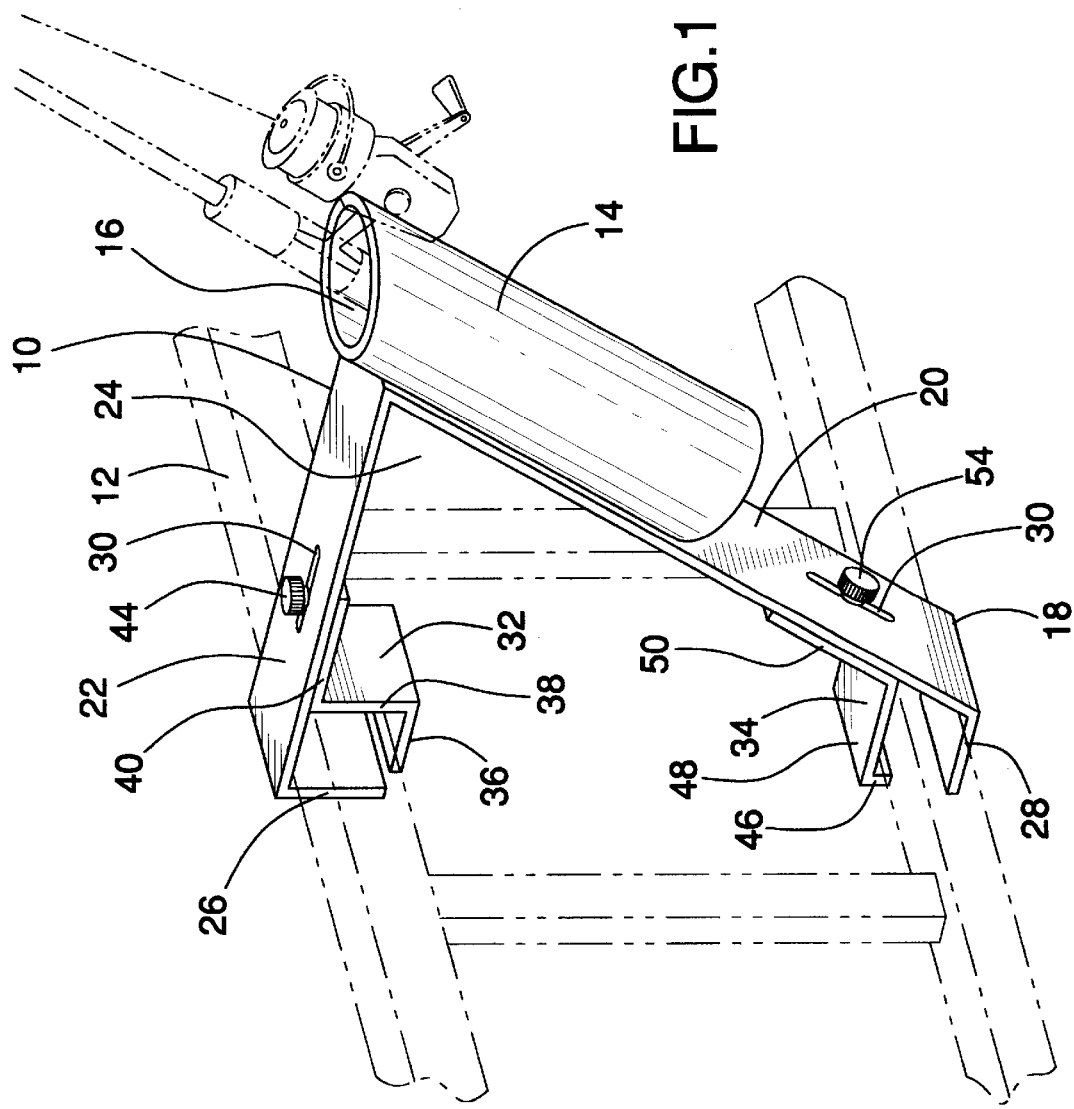
FIG. 1 is a side perspective view of the preferred embodiment of the rail mounted fishing pole holder of the present invention mounted to a railing.
Figure 2:
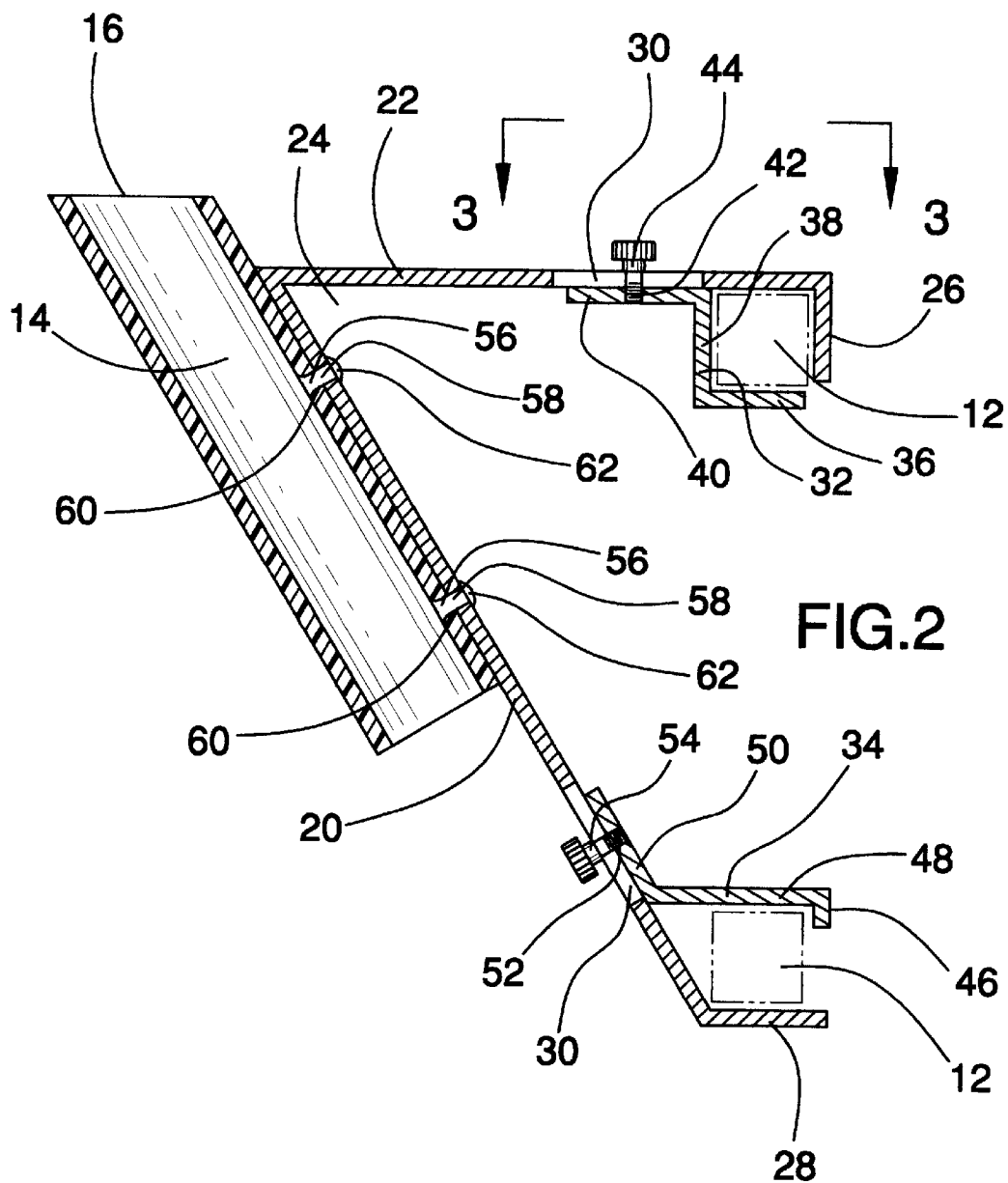
FIG. 2 is a side sectional view of the rail mounted fishing pole holder of the present invention.
Figure 3:
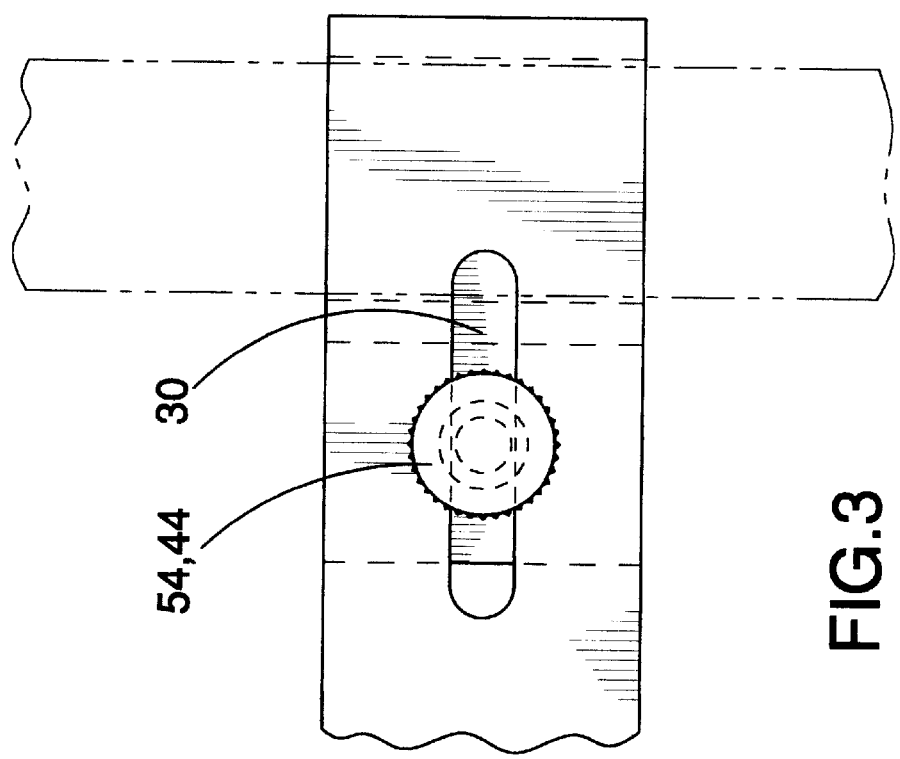
FIG. 3 is a top view of the adjustable bracket groove and bolt of the present invention.

Referring now to the drawings, and particularly to FIGS. 1–3, a preferred embodiment of the rail mounted fishing pole holder of the present invention is shown and generally designated by the reference numeral 10.

In FIG. 1, a side perspective view of a new and improved rail mounted fishing pole holder 10 is shown mounted to a standard rail 12. Shown is a cylindrical holder 14 that comprises a base and an opening 16. Also shown is a fishing pole mount 18 that comprises a lower arm 20 and an upper arm 22 attached at an acute angle 24 so that a seven shape is formed. Said mount 18 further comprises an upper flap 26 attached at a right angle to the end of said upper arm 22. Said mount 18 additionally comprises a lower flap 28 attached to said lower arm 20 at an angle equal to one hundred and eighty degrees minus said acute angle 24 between said upper 22 and said lower 20 arm. Said upper arm 22 and said lower arm 20 comprise a groove 30 near said ends of said arms 22 and 20.

A bracket system for the present invention is also illustrated in FIG. 1. Said system comprises an upper clamp 32 and a lower clamp 34. Said upper clamp 32 comprises a first 36, a second 38, and a third member 40. Said first member 36 is attached at a right angle to said second member 38 and said third member 40 is attached to the opposite side of said second member 38 at a right angle in the opposite direction of said first member 36. Said third member 40 comprises a threaded hole 42 through which passes a top bracket bolt 44. Said top bracket bolt 44 also passes through said groove 30 in said upper arm 22. Said top bracket bolt 44 is tightened and holds said upper clamp 32 in an adjustable position to grasp an upper railing 12. Said lower clamp 34 comprises a first 46, a second 48, and a third member 50. Said first member 46 is attached at a right angle to said second member 48 and said third member 50 is attached to the opposite side of said second member 48 at an angle equal to one hundred and eighty degrees minus said acute angle 24 between said upper 22 and said lower arm 20 in the opposite direction of said first member 46. Said third member 50 comprises a threaded hole 52 through which passes a bottom bracket bolt 54. Said bottom bracket bolt 54 also passes through said groove 30 in said lower arm 20. Said bottom bracket bolt 54 is tightened and holds said lower clamp 34 in an adjustable position to grasp a lower railing 12.

In FIG. 2 a sectional view of the present invention illustrates the attachment mechanisms of the four primary parts of the present invention. A cylindrical holder 14 is shown comprising a pair of threaded holes 56. A pair of holder bolts 58 pass through a pair of holes 60 in said lower arm 20. Said bolts 58 are attached to said threaded holes 56 in said holder 14 and the head of said bolts 58 are secured against the surface of said lower arm 20. Also shown is a view of said top 44 and said bottom 54 bracket bolts. Said bolts pass through said grooves 30 in said upper 22 and lower arms 20. They are threaded to attach to said bracket bolts 54 and 44. The heads 62 of said bolts comprise a ribbed surface that can be grasped by the user. The user slides said clamps along said grooves until said clamps and said flaps snuggly grasp an upper and a lower railing. When said clamps are in place the user tightens said bracket bolts to secure said clamps in place. Also illustrated in this figure is the unique shape of the present invention designed to be securely supported by a pair of watercraft railings. The holder comprises a pair of arms attached at an angle so that said upper arm 22 is horizontal and said lower arm 20 passes to meet with a lower railing. Each arm has a flap attached to the end of said arms which overlap said rails. The upper 32 and lower 34 clamps then bracket the opposite side of said rails.

FIG. 3 illustrates the above-described mechanism for adjustably securing said upper 32 and lower 34 clamps. A head 62 is shown of said bracket bolts. Said heads 62 are designed to be grasped by the user for rotation. The outer edge of said head 62 is ribbed to provide friction with the users fingers. Said arms of said mount 18 rest on each railing. Said bracket bolts are slid to position said clamps so that said rails are firmly grasped. The user then tightens said brackets bolts so that said mount is firmly supported.

A wide variety of materials would be appropriate for the present invention. Said cylindrical holder can be made of plastic and can either be molded or constructed by cutting PVC tubing and attaching a circular piece of plastic to the bottom of said tubing. Said mount and clamps can be made of molded plastic as well or can comprise a metal member bent to the appropriate shape. Said bolts can be made of metal or plastic and can be replaced by nut and bolt mechanisms or riveting mechanisms.

While a preferred embodiment of the rail mounted fishing pole holder 10 has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention. For example, any suitable flexible material may be used instead of the plastics that have been described. And although the mounting of fishing rods has been described, there are slight variations, such as shape and size that would make the invention appropriate for other similarly designed handles.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing pole holder comprising:
   a seven-shaped mount comprising a upper arm and a lower arm wherein there is an acute angle between said upper arm and said lower arm and the ends between said arms are separated by the distance between the opposite sides of a pair of rails on a watercraft;
   a plurality of grooves wherein said upper arm and said lower arm define a groove therein to comprise said grooves;
   a top bracket bolt having opposing ends with one end removably inserted through said groove in said upper arm;
   a bottom bracket bolt having opposing ends with one end removably inserted through said groove in said lower arm;
   an upper clamp attached to said end of said upper arm wherein a portion of said upper clamp is removably attached to said opposing end of said top bracket bolt;
   a lower clamp attached to said end of said lower arm wherein a portion of said lower clamp is removably attached to said opposing end of said bottom bracket bolt; and
   a fishing pole housing attached to said lower arm.

2. The fishing pole holder of claim 1 wherein said housing comprises a cylindrical drum with a bottom, an interior, and a top.

3. The fishing pole holder of claim 1 wherein said fishing pole housing comprises a plurality of threaded holes and said lower arm of said seven-shaped mount comprises a plurality of holes and wherein said mounted fishing pole holder further comprises a plurality of housing bolts wherein said bolts pass through said holes in said lower arm and are removably attached to said fishing pole housing.

4. The fishing pole holder of claim 1 wherein said opposing end of said top bracket bolt is threadedly attached to said upper clamp.

5. The fishing pole holder of claim 1 wherein said opposing end of said bottom bracket bolt is threadedly attached to said lower clamp.

6. The fishing pole holder of claim 1 further comprising an upper flap attached perpendicular to said upper arm.

7. The fishing pole holder of claim 1 further comprising a lower flap attached to said lower arm at an angle equal to one hundred and eighty degrees minus the measure of said acute angle between said upper arm and said lower arm.

8. The fishing pole holder of claim 1 wherein said upper clamp comprises a top bracket comprising a first, a second, and a third rectangular member wherein said first member is attached to said second member at a right angle and said third rectangular member is attached to the opposite end of said second member at a right angle in the opposite direction of said first member and wherein said third member defines a hole therein.

9. The fishing pole holder of claim 1 wherein said lower clamp comprises a bottom bracket comprising a first, a second and a third member wherein said first member is attached at a right angle to said second member and said third member is attached to the opposite side of said second member at an angle equal to one hundred and eighty degrees minus said acute angle between said upper and said lower arm in the opposite direction of said first member and wherein said third member defines a hole therein.

10. A rail mounted fishing pole holder comprising:
   a fishing pole housing comprising a cylindrical drum wherein said drum has a bottom, an interior, and a top;
   a removable mount attached to said housing wherein said removable mount comprises an upper arm and a lower arm;
   a plurality of grooves wherein said upper arm and said lower arm define a groove therein to comprise said grooves;
   a top bracket bolt having opposing ends with one end removably inserted through said groove in said upper arm;

a bottom bracket bolt having opposing ends with one end removably inserted through said groove in said lower arm;

an upper clamp attached to said end of said upper arm wherein a portion of said upper clamp is slidably attached to said upper arm by said opposing end of said top bracket bolt; and a lower clamp attached to said end of said lower arm wherein a portion of said lower clamp is slidably attached to said upper arm by said opposing end of said bottom bracket bolt.

11. The fishing pole holder of claim 10 wherein there is an acute angle between said upper arm and said lower arm and the ends between said arms are separated by the distance between the opposite sides of a pair of rails on a watercraft.

12. The fishing pole holder of claim 11 wherein said fishing pole housing comprises a plurality of threaded holes and said removable mount comprises a plurality of holes and wherein said mounted fishing pole holder further comprises a plurality of housing bolts wherein said bolts pass through said holes in said removable mount and are removably attached to said fishing pole housing.

13. The fishing pole holder of claim 12 wherein said upper clamp is threadedly attached to said opposing end of said top bracket bolt.

14. The fishing pole holder of claim 13 wherein said lower clamp is threadedly attached to said opposing end of said bottom bracket bolt.

15. The fishing pole holder of claim 14 wherein said removable mount comprises an upper flap.

16. The fishing pole holder of claim 15 wherein said removable mount comprises a lower flap.

17. The fishing pole holder of claim 13 wherein said upper clamp comprises a top bracket comprising a first, a second, and a third rectangular member wherein said first member is attached to said second member at a right angle and said third rectangular member is attached to the opposite end of said second member at a right angle in the opposite direction of said first member and wherein said third member comprise a hole.

18. The fishing pole holder of claim 14 wherein said lower clamp comprises a bottom bracket comprising a first, a second and a third member wherein said first member is attached at a right angle to said second member and said third member is attached to the opposite side of said second member at an angle equal to one hundred and eighty degrees minus said acute angle between said upper and said lower arm in the opposite direction of said first member and wherein said third member comprises a hole.

19. The fishing pole holder of claim 17 wherein said opposing end of said top bracket bolt is removably inserted into said hole in said third member of said upper clamp.

20. The fishing pole holder of claim 18 wherein said opposing end of said bottom bracket bolt is removably inserted into said hole in said third member of said lower clamp.

* * * * *